(12) United States Patent
Goodrich et al.

(10) Patent No.: US 8,069,121 B2
(45) Date of Patent: Nov. 29, 2011

(54) END-TO-END SECURE PAYMENT PROCESSES

(75) Inventors: Gary B. Goodrich, Alpine, UT (US); Gregori Pesci, Cedar Hills, UT (US); Bryce Weldon Thacker, Alpine, UT (US); Wayne William Peck, Sandy, UT (US)

(73) Assignee: ProPay Inc., Orem, UT (US)

( * ) Notice: Subject to any disclaimer, the term of this patent is extended or adjusted under 35 U.S.C. 154(b) by 158 days.

(21) Appl. No.: 12/185,706

(22) Filed: Aug. 4, 2008

(65) Prior Publication Data
US 2010/0030697 A1   Feb. 4, 2010

(51) Int. Cl.
*G06Q 20/00* (2006.01)
(52) U.S. Cl. ............ 705/75; 705/14.23; 705/64; 902/5
(58) Field of Classification Search ............ 705/14.23, 705/64, 75
See application file for complete search history.

(56) References Cited

U.S. PATENT DOCUMENTS

| | | | | |
|---|---|---|---|---|
| 5,724,424 | A * | 3/1998 | Gifford | ............................ 705/79 |
| 6,038,552 | A | 3/2000 | Fleichel et al. | |
| 6,339,766 | B1 | 1/2002 | Gephart | |
| 6,732,925 | B1 | 5/2004 | Takayasu | |
| 7,103,576 | B2 | 9/2006 | Mann, III et al. | |
| 7,165,052 | B2 | 1/2007 | Diveley et al. | |
| 7,184,980 | B2 * | 2/2007 | Allen-Rouman et al. | ...... 705/35 |
| 7,225,156 | B2 | 5/2007 | Fisher et al. | |
| 7,284,696 | B2 | 10/2007 | Begola | |
| 7,302,634 | B2 * | 11/2007 | Lucovsky et al. | ............. 715/200 |
| 7,303,120 | B2 | 12/2007 | Beenau et al. | |
| 7,542,942 | B2 | 6/2009 | Peart et al. | |
| 7,676,431 | B2 * | 3/2010 | O'Leary et al. | ................. 705/39 |
| 7,702,583 | B1 * | 4/2010 | Hamilton et al. | ............... 705/40 |
| 2001/0014878 | A1 | 8/2001 | Mitra et al. | |
| 2001/0029485 | A1 | 10/2001 | Brody et al. | |
| 2002/0103753 | A1 | 8/2002 | Schimmel | |
| 2002/0169720 | A1 | 11/2002 | Wilson et al. | |
| 2004/0083184 | A1 | 4/2004 | Tsuei et al. | |
| 2004/0122767 | A1 | 6/2004 | Sanchez | |
| 2004/0127256 | A1 | 7/2004 | Goldthwaite et al. | |

(Continued)

FOREIGN PATENT DOCUMENTS
GB    2419974 A  *  5/2006

(Continued)

OTHER PUBLICATIONS

"Payment Card Industry (PCI) Data Security Standard v 1.1" Sep. 2006. All Pages. Retrieved on Jun. 16, 2010. https://www.pcisecuritystandards.org/security_standards/pci_dss_download.html.*

(Continued)

*Primary Examiner* — Evens J Augustin
*Assistant Examiner* — Calvin K Cheung
(74) *Attorney, Agent, or Firm* — Brooks Kushman P.C.

(57) ABSTRACT

A method of calculating the quality of a data record having a plurality of data fields involves indentifying individual fields in the data record that are incorrect and scoring those fields accordingly. Further fields are identified where any one or more of those fields may be incorrect, but it is not immediately possible to determine which one or ones. These further fields are also scored accordingly. A score for the data records as a whole is then calculated based on the scores assigned to individual fields. Different fields may be weighted according to their importance to the data record as a whole.

2 Claims, 7 Drawing Sheets

U.S. PATENT DOCUMENTS

| | | | |
|---|---|---|---|
| 2004/0153481 | A1 | 8/2004 | Talluri |
| 2005/0015323 | A1* | 1/2005 | Myr .............................. 705/37 |
| 2005/0015332 | A1 | 1/2005 | Chen |
| 2005/0035190 | A1 | 2/2005 | Nanbu et al. |
| 2005/0086160 | A1 | 4/2005 | Wong et al. |
| 2006/0064372 | A1 | 3/2006 | Gupta |
| 2006/0255128 | A1 | 11/2006 | Johnson et al. |
| 2006/0271497 | A1* | 11/2006 | Cullen et al. ................... 705/64 |
| 2006/0282372 | A1 | 12/2006 | Endres et al. |
| 2007/0083460 | A1 | 4/2007 | Bachenheimer |
| 2007/0205275 | A1 | 9/2007 | Nicola et al. |
| 2008/0091944 | A1* | 4/2008 | von Mueller et al. ......... 713/168 |
| 2008/0189214 | A1 | 8/2008 | Mueller et al. |
| 2009/0024471 | A1 | 1/2009 | Nielson et al. |
| 2009/0043696 | A1* | 2/2009 | Ornce et al. .................... 705/39 |

FOREIGN PATENT DOCUMENTS

| | | |
|---|---|---|
| KR | 10-2003-0042788 | 6/2003 |
| KR | 1020050001214 A | 1/2005 |

OTHER PUBLICATIONS

"How Paypal Works." Jun. 9, 2007. All pages. How Stuff Works website. Retrieved Jun. 8, 2010 via Wayback Machine. http://web.archive.org/web/20070609090700/computer.howstuffworks.com/paypal.htm.*

"How Propay Works." May 28, 2007. All pages. Propay website. Retrieved on Jun. 16, 2010 via Wayback Machine. http://web.archive.org/web/20070528112606/epay.propay.com/account/howpropayworks.aspx.*

"How TLS/SSL Works." Mar. 28, 2003. All pages. http://technet.microsoft.com/en-us/library/cc783793(WS.10,printer).aspx.*

"Electronic Funds Transfer—a Whatis.com definition." Whatis.com. Mar. 6, 2006. All pages. Retrieved Jun. 16, 2010 via Wayback Machine. http://web.archive.org/web/20060303085223/http://searchwinit.techtarget.com/sDefinition/0,,sid1_gci214564,00.html.*

Steiner, I. "ProPay Reveals Details of New PayPal Alternative on eBay." Oct. 19, 2008. All pages. AuctionBytes.com. Retrieved Jun. 16, 2010. http://www.auctionbytes.com/cab/abu/y208/m10/abu0225/s02.*

"Payment Card Industry (PCI) Data Security Standard v 1.2" Sep. 2006. All Pages. Retrieved on Jun. 16, 2010. https://www.pcisecuritystandards.org/security_standards/pci_dss_download.html.*

U.S. Appl. No. 12/054,304, mail date Apr. 2, 2009, Office Action.

U.S. Appl. No. 11/943,477, mail date Aug. 10, 2009, Restriction Requirement.

U.S. Appl. No. 11/943,477, filed Nov. 20, 2007, Kendrick et al.

U.S. Appl. No. 12/054,304, filed Mar. 24, 2008, Kendrick et al.

Compliance Benefits of Tokenization, Joel Dubin, Jul. 17, 2007, [online] [retrieved on Jan. 31, 2008], 3 pages, Retrieved from the Internet: http://searchsecurity.techtarget.com/tip/0,289483,sid14_gci1264563,00.html.

Reduce the Barrier to PCI Compliance: Encryption and Key Management Made Simple, Gary Epple, 5 pages, [online] [retrieved on Jan. 31, 2008] Retrieved from the Internet: http://www.paymetric.com/content/documents/transaction_directory_security_article_final.pdf.

PCI Data Security Standard compliance: Three steps to success, Joel Dubin, Jul. 9, 2007, [online] [retrieved on Jan. 31, 2008], 4 pages, Retrieved from the Internet: http://searchcio-midmarket.techtarget.com/tip/0,289483,sid183_gci1263580,00.html.

Using tokenization to secure credit card data and meet PCI Compliance requirements, Bryan Johnson, Oct. 12, 2007, [online] [retrieved on Jan. 31, 2008], 1 page, Retrieved from the Internet: http://www.braintreepaymentsolutions.com/blog/using-tokenization-to-secure-credit-card-data-and-meet-pci-compliance-requirements/.

PCI Compliance & SecureVault, [online] [retrieved on Jan. 31, 2008], 3 pages, Retrieved from the Internet: http://www.braintreepaymentsolutions.com/pci-compliance/p/3/.

First Data Unveils the Low Cost Complete Point-of-Sale Solution Integrating Products From First Data, LinkPoint, TeleCheck, and Valuelink. [online] [retrieved on Jul. 28, 2008], 1 page, Retrieved from the Internet: http://ir.firstdata.com/news/releasedetail.cfm?ReleaseID=90159.

Data Security, Hannaford School of Hard Knocks: While there is no cure-all to data theft, the case offers insight to strengthening the industry as a whole; Tom Wright, 2 pages, Jul. 2008 Transaction Trends.

MagTek Introduces the iPad(R), the most Secure PINpad providing end to end Protection, [online] [retrieved on Jul. 31, 2008], 3 pages, Retrieved from the Internet: http://www.reuters.com/article/pressRelease/idUS109900+14-Apr-2008+BW20080414.

VeriFone; VeriShield Protect; The most innovative, comprehensive and definitive security solution, [online] [retrieved on Jul. 31, 2008], 1 page http://www.verifone.com/industry-solutions/retail/payment-trends--security/verishield-protect.aspx.

MagTek Home Page [online] [Retrieved Jun. 19, 2007], 1 pg. Retrieved from the Internet: http://web.archive.org/web/20070819100231/http://www.magtek.com/.

Notification Concerning Transmittal of Copy of International Preliminary Report on Patentability (Chapter I Of The Patent Cooperation Treaty), from the International Bureau, International Application No. PCT/US2008/084229, filed Nov. 20, 2008, 8 pgs.

Non-Final Office Action dated Dec. 28, 2009 for U.S. Appl. No. 11/943,477, filed Nov. 20, 2007, 15 pgs.

Final Office Action dated Aug. 4, 2010 for U.S. Appl. No. 11/943,477, filed Nov. 20, 2007, 11 pgs.

Non-Final Office Action dated Apr. 2, 2009 for U.S. Appl. No. 12/054,304, filed Mar. 24, 2008, 19 pgs.

Final Office Action dated Nov. 20, 2009 for U.S. Appl. No. 12/054,304, filed Mar. 24, 2008, 21 pgs.

Non-Final Office Action dated Jul. 15, 2010 for U.S. Appl. No. 12/054,304, filed Mar. 24, 2008, 23 pgs.

"NeoScale Extends Storage Security Leadership—First to Deliver Global Key Management Across Distributed Enterprise," PR Newswire, New York: Oct. 25, 2005, p. 1 (ProQuest Doc ID: 916181111).

Final Office Action dated Mar. 8, 2011 for U.S. Appl. No. 12/054,304, filed Mar. 24, 2008.

* cited by examiner

END-TO-END SECURE PAYMENT PROCESSES

CROSS-REFERENCE TO RELATED APPLICATIONS

Not applicable.

BACKGROUND OF THE INVENTION

1. The Field of the Invention

The present invention relates to secure payment methods and systems. More particularly, the present invention relates to methods and systems to allow merchants to perform payment processing such that a customer can securely provide sensitive payment data to a merchant and the merchant is not required to store the sensitive payment data to perform a payment processing transaction.

2. The Relevant Technology

In purchasing transactions, there are various restrictions that are placed on merchants to ensure that encrypted payment device data is protected from potential fraudulent activity. Such restrictions can increase the administrative cost of performing purchasing transactions. For example, PCI DSS is a set of standards relating to, among other things, the security of customer identification data (e.g., credit card numbers, identification data, etc.) by merchants that accept credit card payments. Becoming and remaining PCI-compliant represents a significant expense to many merchants in terms of both infrastructure costs and initial/ongoing auditing costs. Estimates are in the hundreds of thousands to millions of dollars for large companies to implement these standards on their existing point of sale systems. Thus, it would be advantageous to provide merchants with systems and methods to enable merchants to perform payment processing requests without being required to be PCI-compliant. PCI compliance is only one example of a restriction that can be placed on a merchant to protect encrypted payment device data and defines particular steps that a merchant must take to ensure that customer identification data is securely maintained. However, there may be other regulations which define other types of data that a merchant must secure or that limit the merchant's distribution of data. Thus, it would be desirable to provide merchants with systems and methods for greatly reducing costs to comply with these various regulations.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The present invention relates to systems and methods for allowing merchants to makes secure payment processing requests while being free from restrictions presented by various purchase transaction regulations, such as, but not limited to, PCI-compliance. The following description will use PCI compliance as one example of a regulation imposed upon merchants to protect encrypted payment device data. However, PCI compliance is simply one example of a type of regulation that presents additional cost to merchants, which would be desirable to overcome while still upholding the intent and language of the regulation. Advantageously, the present invention can eliminate the need for the merchant to store sensitive payment data (such as credit card and checking account data) as well as the cost to comply with PCI regulations, while still allowing the merchant to perform normal payment processing transactions between the merchant and its customers. As used herein, the terms "merchant" and "biller" will be used interchangeably to indicate an entity receiving payment. The terms "customer" and "payor" will be used interchangeably to indicate an entity which is presenting payment.

Figure 1:
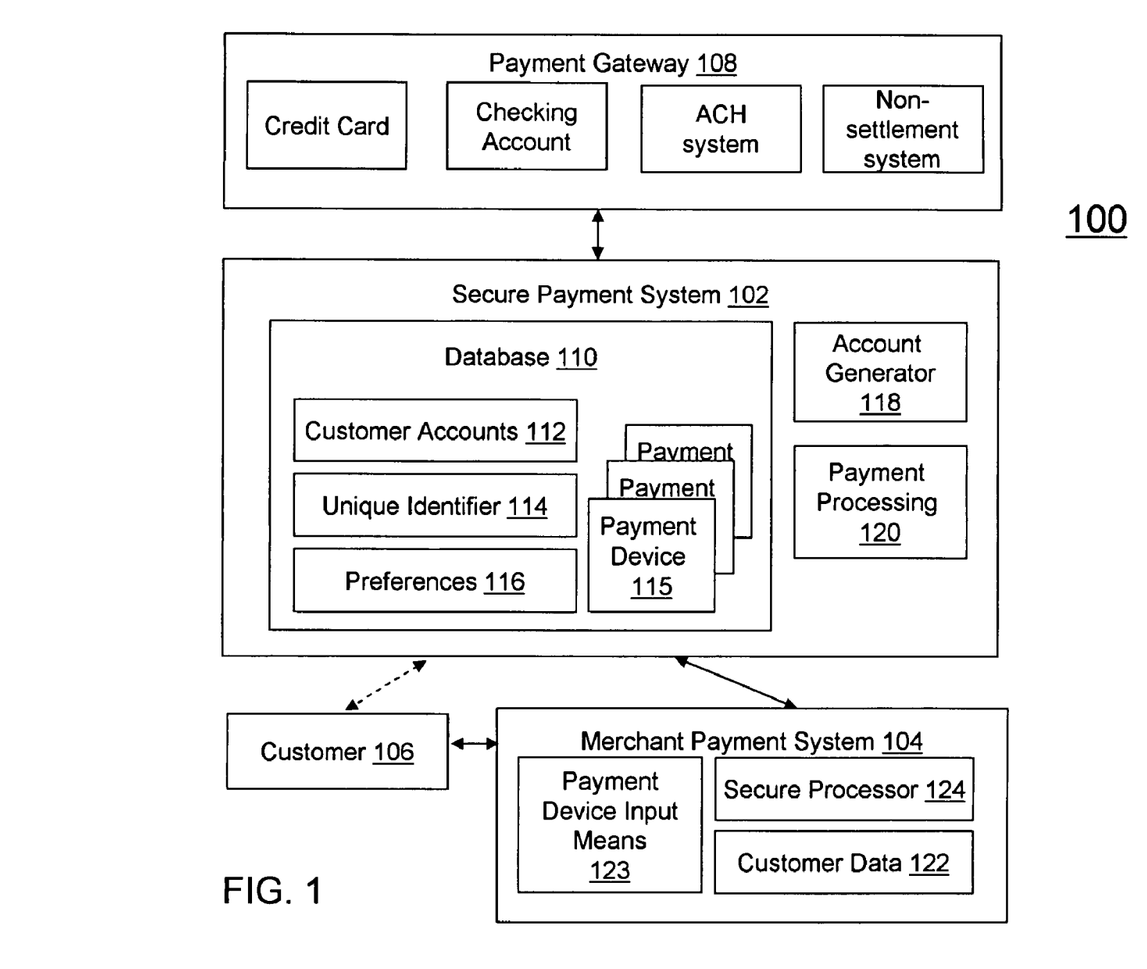
FIG. 1 illustrates an example of a network environment for implementing methods of the present invention.

FIG. 1 shows one example of a distributed network environment 100 in which methods of the present invention may be implemented. Environment 100 includes a secure payment system 102 that can communicate with a merchant payment system 104 and, optionally, a customer 106. In some embodiments, secure payment system 102 will only communicate with a merchant payment system 104; however, in other embodiments, communication with both merchant payment system 104 and customer 106 is possible, as will become more clear from the description below. The secure payment system 102 is an intermediary between the merchant payment system 104 and a payment gateway 108 that allows the merchant payment system 104 to receive authorization for payment processing requests, while, at the same time, shielding the merchant from sensitive payment data so that the merchant does not have to be PCI-compliant. Furthermore, the secure payment system 102 provides mechanisms for shielding a customer from giving out sensitive payment data when the customer attempts an electronic payment transaction. Advantageously, this prevents a customer from worrying whether the merchant will fraudulently use the customer's sensitive payment data. The payment gateway 108 accesses various payment authorization systems/networks including, but not limited to, credit card, checking account, automated clearing house (ACH) systems, proprietary non-settlement payment systems, and the like. The elements of network environment 100 can communicate by any means for establishing electronic communication such as, but not limited to, a USB connection, a wireless Bluetooth connection, a RFID connection, an Internet connection, a LAN connection, a WAN connection, a cellular connection, a satellite connection, and the like. The exact type of connection is not important.

Secure payment system 102 can include a database 110 that stores various data for performing secure payment processing along various secure paths. For example, one embodiment of a secure path provides customer accounts 112 associated with one or more unique identifiers 114, which a customer can use to identify itself to a merchant, instead of identifying sensitive payment device data, such as a credit card account number, checking account number, and the like. In this manner, the customer's sensitive payment data remains unknown to the merchant, while still allowing the merchant to perform a payment processing request.

In the context of the use of unique identifiers and customer accounts, to clarify the broadness of the terms being used herein, the term "customer" generally refers to any combination of people and entities that are authorized to use a customer account. A customer could be a single person authorized to use a unique identifier to make payment using the customer account; or the customer could be two or more persons who each are authorized to use a unique identifier to perform payment processing transactions using the same customer account. Alternatively, a business or organization can be associated with a unique identifier with certain people within the organization being authorized to use the unique identifier to perform payment processing transactions. Thus, the terms customer and customer account are intended to be broad in scope. In addition, a person or organization may have the use of more than one customer account. For example, a customer may have one customer account for personal use and a different customer account for business use. The flexibility and ease with which customers can use and define customer accounts will be apparent from the description below.

As also shown in FIG. 1, database 110 can also store payment device info 115 for one or more customers. The payment device info 115 may or may not be associated with a customer account 112, depending on which secure path the merchant uses to perform the payment processing, described further below. However, generally, the payment device info 115 allows electronic payment transactions to be performed between the merchant payment system 104 and the payment gateway 108. Each customer account 112 can also have rules or preferences 116. Preferences provide a large amount of flexibility in how a customer account can be used. For example, preferences can define a hierarchy of payment devices, merchant-specific preferences that apply to particular merchants, distributed payment rules/options, maximum purchase amount for electronic payment transactions, maximum number of purchases allowed, minimum balances that must be maintained on the customer account, and the like. Such flexibility allows a customer to also use a single customer account to perform both personal and business payment processing transactions, which can be defined by the preferences.

The secure payment system 102 includes an account generator module 118 that manages creation, definition, and/or modification of customer accounts, unique identifiers, and/or preferences. Further, the secure payment system 102 includes a payment processing module 120 that processes payment processing requests from the merchant payment system 104 and, as needed, accesses the customer accounts and preferences based on a unique identifier included in a payment processing request.

Secure payment system 102 can thus be one or more computing devices that have computer readable media storing executable instructions thereon that when executed by a processor on the one or more computing devices cause the one or more computing devices to execute the functions of the secure payment system 102. In one embodiment, the secure payment system 102 includes a distributed system of servers that include processors and storage devices for performing methods of the present invention. Since the secure payment system operates in a distributed manner, the singular elements of database 110, account generator module 118 and payment processing module 120 can also be plural elements.

The merchant payment system 104 represents one or more computing devices that have computer readable media storing executable instructions thereon that when executed by a processor on the one or more computing devices cause the one or more computing devices to execute the functions of the merchant payment system 104. The merchant payment system 104 can be any device that is able to identify a payment device proffered by a customer including, but not limited to, a point of sale terminal, a personal digital assistant (PDA), a mobile phone, a desktop computer, a laptop computer, a networked computer, an automatic teller machine, a specialized storage device, and the like. Thus, merchant payment system 104 may also connect to a network and can transmit and receive transactions. In general, the merchant payment system 104 has an input component that accesses payment device and/or customer identifying data as described herein, and a networking component, which transmits transaction requests over a network.

The customer 106 represents an entity, device, and/or computing device that can be used to provide payment device data and/or customer identifying data to the merchant. Thus, in some embodiments, the customer herself 106 does not have to present a payment device either in person or electronically, but may be able relay the payment device data verbally or in writing whether in person, over the phone, via facsimile, and the like. The customer 106 can represent presentment of any payment device such as, but not limited to, a financial card (e.g., a credit card, a debit card, a rewards card), a smart card, RFID enabled cards, IR enabled cards, and the like. As used herein, the term "payment device" is broadly defined to include any instrument which is tied to a financial account such as, but not limited to, a credit card account, checking account, or other non-settlement financial accounts. In addition, the customer 106 can represent any computing device that is able to relay the payment device data to the merchant including, but not limited to, a personal digital assistant (PDA), a mobile phone, a desktop computer, a laptop computer, a networked computer, and the like. Thus, customer 106 may also connect to a network and can transmit and/or receive transaction data.

When the customer 106 presents payment device data to the merchant 104, the present invention provides for sensitive payment device data to be securely encrypted and passed onto the secure payment system 102 so that the merchant is not required to store sensitive payment device data and yet is still able to perform a payment processing transaction.

When a customer is ready to pay the merchant, such as at a merchant point of sale terminal or a payment checkout point on the merchant's website, the customer supplies customer identification data and payment device data. The merchant payment system 104 may optionally store the customer identification data as customer data 122. A secure processor module 124 at the merchant payment system 104 securely encrypts the sensitive payment device data and does not store the sensitive payment device data in any form at the merchant payment system. The merchant payment system 104 transmits a first payment processing request to the secure payment system 102. In the first payment processing request, the merchant payment system 104 includes the encrypted payment device data along with customer identification data.

The secure payment system 102 can then follow two alternate secure paths. In a first path, the account generator module 118 decrypts the encrypted payment device data and creates a customer account, assigning a unique identifier to the customer account. The account generator module 118 returns the unique identifier to the merchant payment system 104. The merchant payment system 104 uses the unique identifier to generate a subsequent payment processing request. The merchant payment system can also store the unique identifier for use in generating future payment processing requests. The secure payment system 102 receives the second payment processing request and generates an authorization request using the payment device data stored at the secure payment system, which is sent to the payment gateway 108 for authorization. The authorization request is sent to payment gateway 108 which generates or obtains a status indicator of the payment processing requests—whether approved, denied, or error. The payment gateway 108 returns the status indicator to the secure payment system 102 which forwards the status indicator to the merchant payment system 104.

Advantageously, the first path can allow a merchant to generate payment authorization requests simply by knowing the unique identifier of the customer. This embodiment can be useful for merchants that make recurring payments for repeat customers. Thus, after the customer account is securely generated in a manner in which the merchant is not required to store sensitive payment device data, subsequent payment processing transactions can occur between the merchant and customer. Various ways for the merchant to identify the unique identifier of the customer in order to perform an electronic payment transaction are possible. Since the present invention is not limited to any particular way of conveying the unique identifier data to the merchant, a few non-limiting examples will be described. For example, the customer can provide the unique identifier through a website of the merchant or at a point of sale device of the merchant. Alternatively, the customer does not need to provide the unique identifier and the merchant may be able to identify a unique identifier using other data provided by the customer—such as customer name, customer contact data (phone number, address, email), a customer ID specific to the merchant, and the like. The present invention is not dependent on how the merchant identifies the customer or the customer's unique identifier.

In the second secure path, the payment processing module 120 of the secure payment system 102 leaves the encrypted payment device data in its current form (i.e., does not decrypt), and uses the encrypted payment device data and/or customer identification data to generate an authorization request. The authorization request is sent to payment gateway 108 which generates or obtains a status indicator of the payment processing requests—whether approved, denied, or error. The payment gateway 108 returns the status indicator to the secure payment system 102 which forwards the status indicator to the merchant payment system 104. This embodiment may be useful for single-use processing requests or mass-purchasing transactions (e.g., retail supermarkets) in which it is not important that the merchant keep a record of customer data.

Figure 2:
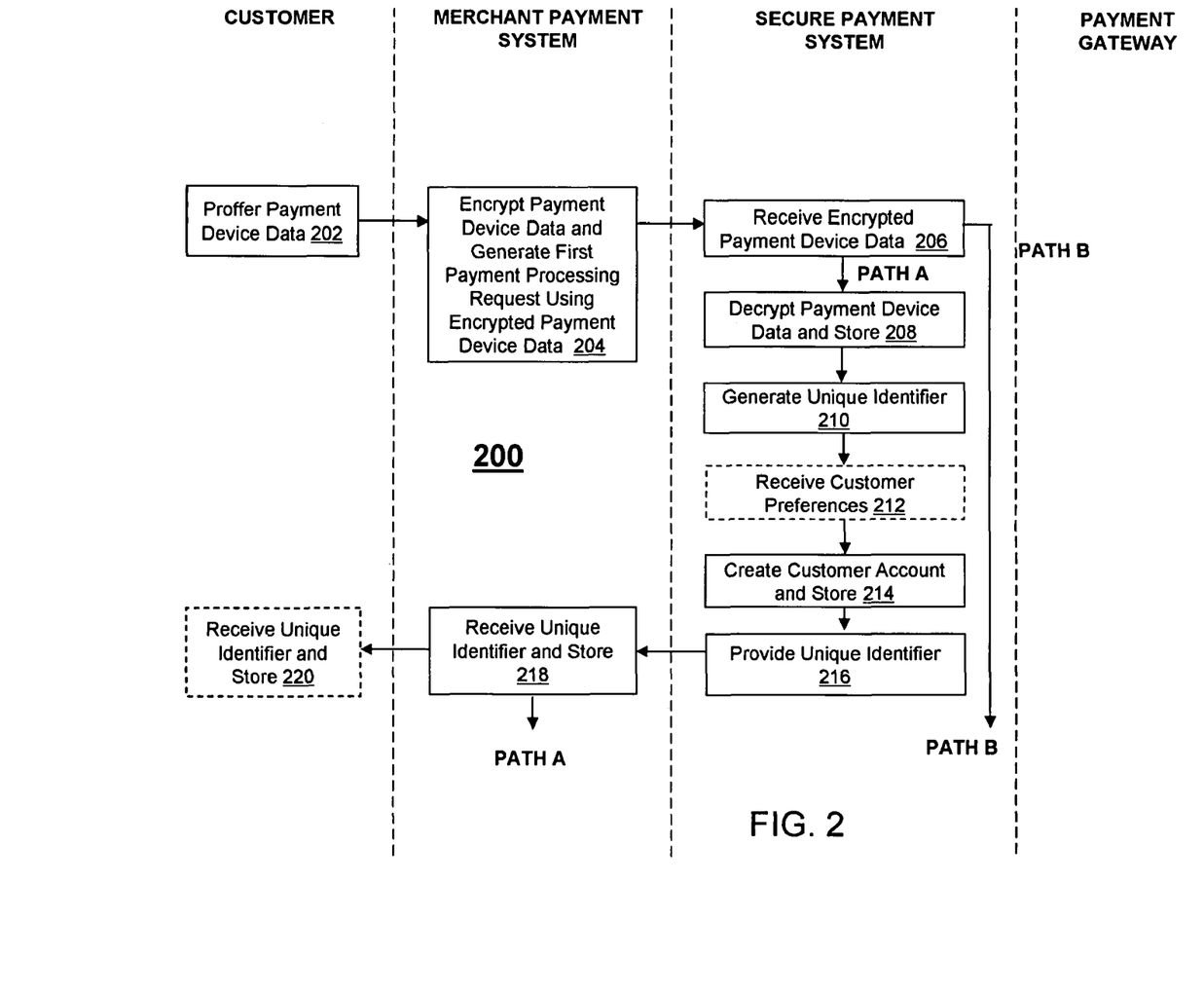
FIG. 2 illustrates an example method of processing one or more payment processing requests using an end-to-end secure solution.

With reference to FIG. 2, the two secure paths are shown in method 200 of allowing a merchant payment system to receive payment from a customer and generate an authorization request with either a unique identifier or with the encrypted payment device data itself—without requiring a merchant payment system to store sensitive payment device data. Note that FIG. 2 is divided onto two pages and both pages should be considered together. Both paths are shown as nonlimiting examples of how a merchant payment system can receive payment device data without being required to store sensitive payment device data and/or use sensitive payment device data to generate a payment authorization request. However, other paths or ways of achieving this may be possible based from teachings herein.

At 202, the customer in some manner proffers payment device data and/or customer identification data. This can be done in various ways—either during a sales transaction in person, during a sales transaction through the merchant's website, and the like. In one embodiment, the payment device data is proffered by the customer swiping a card or otherwise presenting a payment device itself for payment.

At 204, the merchant payment system receives the payment device data and/or customer identification data. The merchant payment system encrypts the payment device data. The encryption can use encryption code that only the secure payment system can decrypt, for Path A. Alternatively, the encryption can be based on a specific authorizing network, where the authorizing network will decrypt the payment device data when authorizing a payment through the payment gateway, for Path B. The merchant payment system then generates a first payment processing request using the encrypted payment device data and/or customer identification data and transmits the first payment processing request to the secure payment system.

As mentioned, the merchant payment system can obtain the payment device data and/or customer identification data in an in-person transaction or in a transaction where the customer is not physically present, such as through the merchant's website, over the phone, via facsimile, etc. Further, the merchant payment system can perform the encryption of the sensitive payment device data at a delayed time from receiving the payment device data and/or customer identification data. For example, the merchant can receive a swipe of a customer card in a specialized storage device, which encrypts the payment device data while the specialized storage device is not connected to a network. At a later point in time, the merchant can connect the specialized storage device to a network and obtain the encrypted payment device data. This particular embodiment is described in further detail in co-pending U.S. patent application Ser. No. 11/943,477, filed Nov. 20, 2007, which disclosure is incorporated herein by reference in its entirety. Thus, the first payment processing request can be generated independent of when a customer is proffering payment or attempting an electronic payment transaction.

At 206, the secure payment system receives the encrypted payment device data and/or customer identification data. The secure payment system can then either initiate creation of a customer account (Path A) or directly proceed with a payment authorization request (Path B).

If the secure payment system goes along Path A, at 208, the secure payment system decrypts the encrypted payment device data. This assumes that the secure payment system has knowledge of the encryption algorithm and keys used by the merchant payment system. At 210, the secure payment system generates a unique identifier associated with the customer account. The unique identifier can be any random sequence of alphanumeric characters and/or symbols. In one embodiment, the unique identifier is not based from any sensitive customer data so that it cannot be used to derive this sensitive data, especially where the unique identifier is intended to be given to the merchant without fear of exposing sensitive data. However, it is possible for the unique identifier to be at least partially based from data relating to one or more payment devices of the customer.

At 212, optionally, the secure payment system receives one or more preferences (shown as 326 in FIG. 3) associated with the unique identifier. The preferences are described in further detail in co-pending U.S. patent application Ser. No. 12/054, 304, filed Mar. 24, 2008, which disclosure is incorporated herein by reference in its entirety.

At 214, the secure payment system generates a customer account and associates the customer account with the unique identifier. The secure payment system also stores the customer account, unique identifier, customer identification data, the payment device data, and the preferences associated with the customer account.

Figure 3:
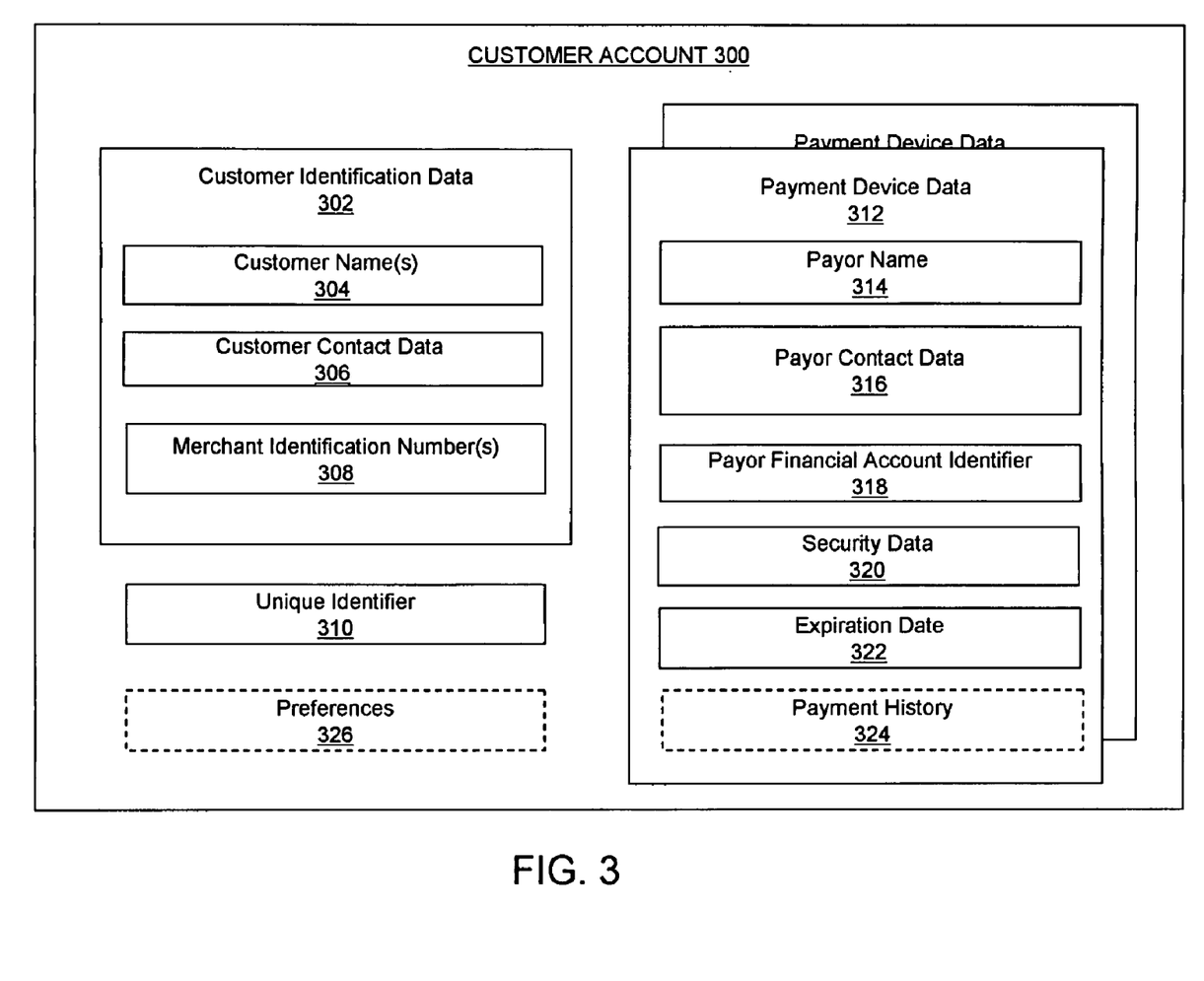
FIG. 3 illustrates an example of a customer account.

FIG. 3 illustrates a unique identifier 310 associated with a customer account 300, and shows an example of a customer account 300 in greater detail. The customer identification data 302 that can be received from the merchant and/or customer can include, but is not limited to, customer name(s) 304 (which can include any number of names or persons or organizations authorized to use the customer account), customer contact data 306 (address, phone number, email, fax, social security number, etc.), and merchant identification number(s) 308 (while a particular merchant may request generation of a customer account, there can be more than one merchant that can submit payment processing requests using the same customer account, and, hence, same unique identifier).

FIG. 3 also shows examples of payment device data 312 for a first payment device is depicted, which can include, but is not limited to, payor name 314, payor contact data 316, payor financial account identifier 318 (such as an account number, checking/debit account number, routing transit number), security data 320 (such as a PIN verification data), and expiration date 322 of the payment device.

The type of payment device data will vary depending on the payment device offered. The magnetic strip on the back of many financial cards can contain data about the account number, the name of the card owner, expiration date, a service code, and other discretionary data such as a pin verification key indicator, pin verification value, or card verification value/code. For checks, the magnetic strip at the bottom of the check can include a routing transit number, an account number, and/or a particular check number. EMV cards may proffer additional cryptographic authentication data to provide authentication of the card to the payment gateway. For example, the customer may be required to enter their PIN into the merchant payment system, which is included in the payment device data 312 as security data 320 for payment processing in an encrypted format.

Other security data 320 includes biometric data, for example, where the owner of the payment device is required to perform a thumbprint scan, which data is encrypted for payment authorization. This data can be conveyed to the secure payment system in any variety of ways such as manually entering the data, swiping a payment device through a card reader to obtain data contained on a magnetic strip of the payment device, passing the payment device in front of a wireless reader, inserting the payment device into a payment device detector, and the like. Where some of the payment device data may not be readily available from the merchant or from the payment device itself, the customer may be required to supply this data, such as PIN, bio data, and the like.

Some of the data for customer identification 302 and payment device data 312 may overlap. For example, where the customer is the same as the payment device owner, the customer name and payor's name and contact data may be the same. In addition, as shown in FIG. 3, the secure payment system may optionally store payment history data 324 of payments requested and/or processed in connection with the particular customer account.

At 216, the secure payment system provides the unique identifier to at least one of a merchant or a customer who, at 218 and 220, respectively, receive the unique identifier. As mentioned above, the customer can present the unique identifier when the customer desires to make a payment. Or, the merchant can store the unique identifier (associated with customer identification data maintained by the merchant), and access the unique identifier when the customer makes a payment. While the unique identifier has been described as being stored at the merchant payment system or by the customer computer, it will be appreciated that the unique identifier could be stored on a physical card that the customer can carry with him/her. As long as storing the unique identifier in this manner does not violate PCI compliance, this may be another viable method of implementing the present invention. Advantageously, Path A allows a merchant to send the encrypted payment device data directly to the secure payment system rather than redirecting the customer to a different site to be able to provide their sensitive payment device data. The merchant then only needs to use the unique identifier in order to process any payment processing transaction for the particular payment device.

At 224, the secure payment system receives a payment processing request from a merchant that includes the unique identifier. At 226, the secure payment system generates an authorization request which includes processing the payment processing request according to the one or more preferences, if specified, such that the merchant is only required to specify the unique identifier of the customer account and not the data specific to the first payment device or second payment device. Processing the payment processing request includes identifying the unique identifier in the payment processing request. The secure payment system uses the unique identifier to access the database to identify the corresponding customer account, at least one payment device to be used to satisfy the payment processing request, and any preferences. If the payment processing request does not meet one of the preferences specified in the customer account, then the secure payment system sends a status notification to the merchant. The merchant can then make any corrections (or obtain data from the customer if necessary), and resubmit the payment processing request. Or, the customer may be given an opportunity to change the preferences to allow the payment processing request to go through. If the payment processing request does meet all of the preferences, the secure payment system generates an authorization request using the data in the customer account.

At 228, the payment gateway processes the authorization request. The payment gateway accesses various payment systems including, but not limited to, credit card, banking, ACH systems, or proprietary non-settlement payment systems. The selected payment system processes the authorization request. At 230, the payment gateway returns a payment authorization status that can include data on whether the billing data was submitted to one of the payment systems and the status of the payment authorization request (i.e., approved, declined, or process failure). Notably, in embodiment where a merchant specifies only a unique identifier, the merchant is unaware of how the authorization request is actually processed. In other words, the merchant does not know whether payment was made through a customer's credit card, checking account, debit account, or other financial account. The merchant is only aware that the payment was authorized, declined, or whether there was some system failure.

At 232, the secure payment system associates the payment authorization status with the customer account and forwards the payment authorization status to the merchant. At 234, the merchant receives the payment authorization status and, at 236, can complete its processes to complete the electronic payment transaction. This may include, at 238, sending a transaction receipt to the customer. The above process illustrates that where the merchant elects not to include sensitive payment data in the payment processing request, and only includes encrypted payment device data and/or a unique identifier, the merchant is still able to complete the payment transaction.

Figure 6:
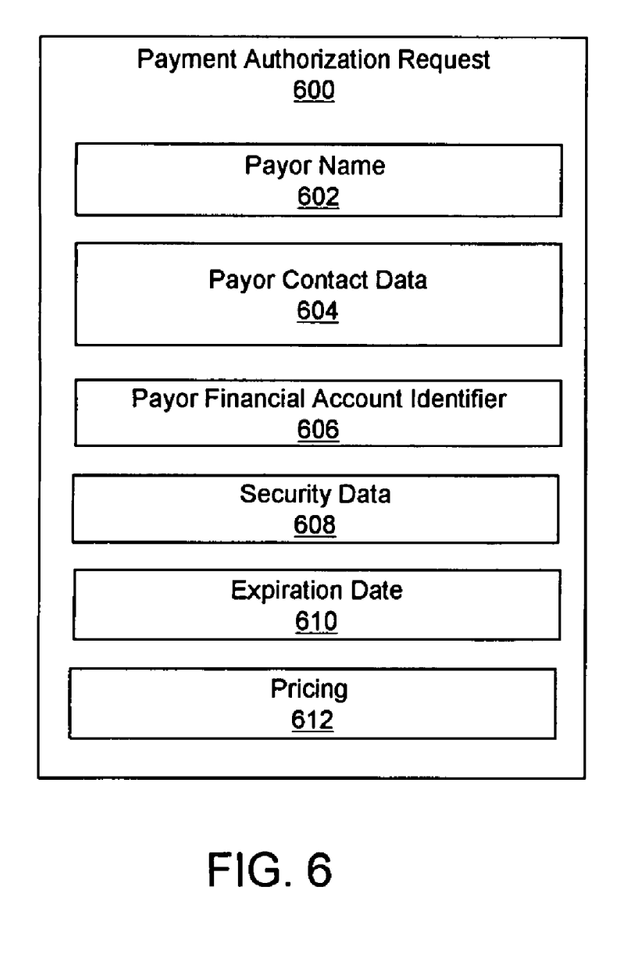
FIG. 6 illustrates an example of one embodiment of a payment authorization request.

The present invention provides a large amount of flexibility in how a merchant can use the system. As mentioned above, in one embodiment, the secure payment system may not actually decrypt the payment device data. Instead, as shown in FIG. 2, in an alternate Path B, at 226, the secure payment system may use the encrypted payment device data to generate an authorization request. FIG. 6B shows that in Path B, the authorization request can thus include the sensitive payment device data in an encrypted format.

At 228, the authorization request is processed by the payment gateway as already described above, with the appropriate authorizing network of the payment gateway decrypting the sensitive payment device data in order to complete the authorization transaction. At 230 and 232, the merchant then receives a notification of whether the payment was approved, denied, or pending for any reason. Advantageously, the merchant does not need to store any sensitive payment device data. Since the customer's financial data remains encrypted until it reaches the payment gateway, this relieves the merchant from having to be PCI-compliant.

Figure 4:
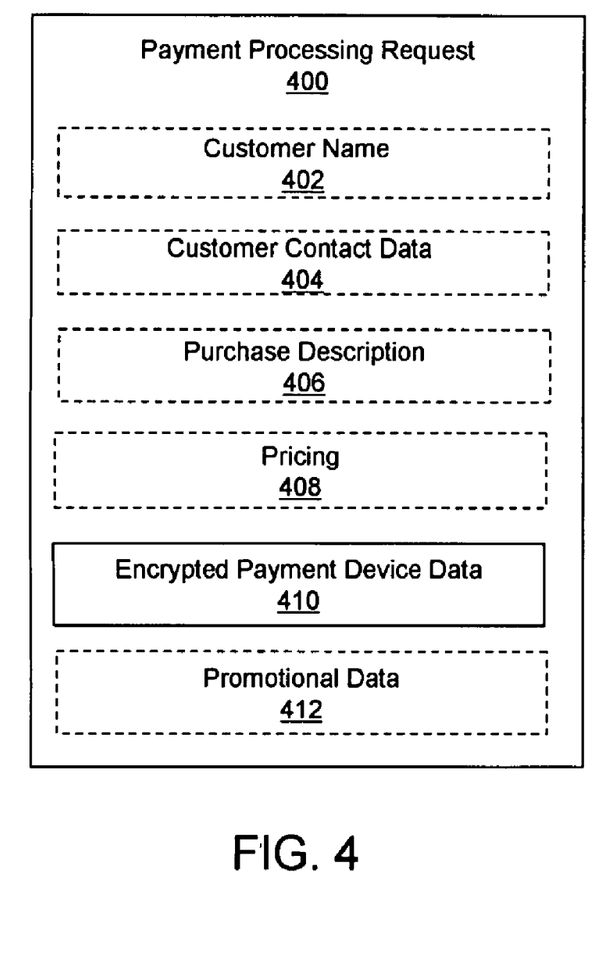
FIG. 4 illustrates an example of a one embodiment of a payment processing request.
Figure 5:
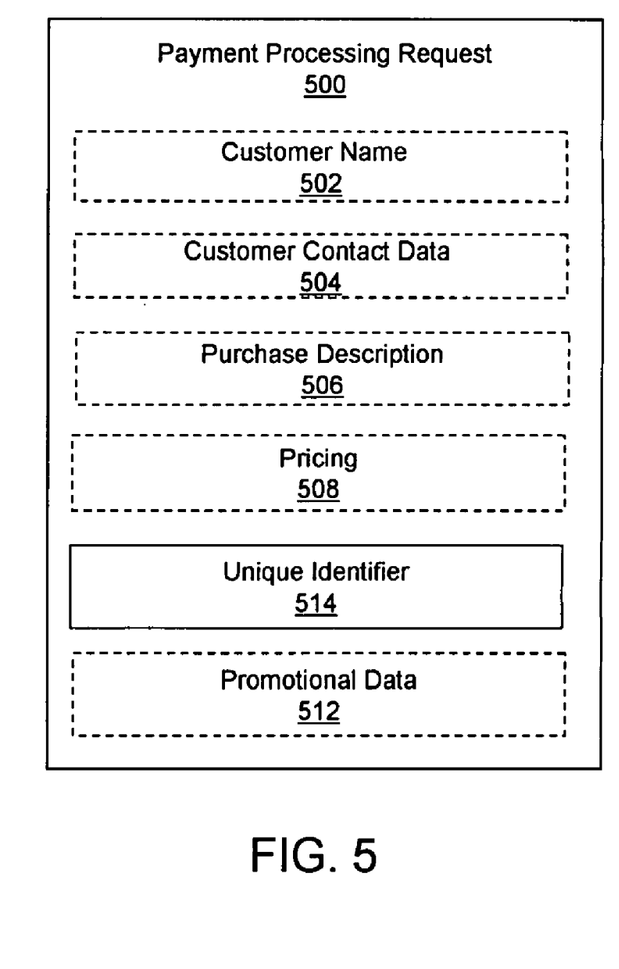
FIG. 5 illustrates an example of another embodiment of a payment processing request.

Thus, the content of payment processing requests in blocks 204 and 222 can vary depending on which secure path is used. FIGS. 4 and 5 illustrate two types of payment processing requests that can be generated by the merchant payment system. FIG. 4 illustrates an example of a payment processing request that can be used as a first payment processing request in Path A or as the only payment processing request in Path B. As shown in FIG. 4, a payment processing request 400 can include data pertaining to the particular purchase. As such, the payment processing request 400 may include customer name 402, customer contact data 404 (such as address, telephone, email, etc.), purchase description 406 (such as items/services purchased, quantities, purchase amounts, etc.), pricing 408 (such as purchase price, tax, total purchase amount, shipping, handling, etc.), and encrypted payment device data 410. The payment processing request 400 may also include any promotional data 412 (such as discounts). In its most simple embodiment, the payment processing request 400 need only identify the pricing 408 and encrypted payment device data 410 in order to allow the secure payment system to complete authorization of the payment. However, certain payment gateways may require additional data and it will be appreciated that the payment processing request 400 can be modified as necessary to accommodate any required data. Certain elements of the payment processing request are depicted in dashed lines to illustrate that such data can be optional in certain cases.

FIG. 5 is similar to FIG. 4 and illustrates an example of a payment processing request that can be used as the second payment processing request in Path A. Thus, similar elements are referred to with like reference numerals, replacing 400's with 500's. Additionally, instead of having encrypted payment device data 410, the payment processing request 500 has a unique identifier (i.e. a unique identifier associated with a customer account at the secure payment system). FIGS. 4 and 5 further serve to illustrate that the elements in dashed lines may be needed in one request, but not the other. For example, in Path A, the payment processing request in FIG. 4 may have less information than for Path B because some of that data may be proceed in the subsequent payment processing request of FIG. 5.

Notably, the payment processing request only needs to contain basic data of the amount of money that needs to be authorized and the unique identifier. In one embodiment, the payment processing request does not need to specify any particular payment device to initiate authorization of the electronic payment. However, it is possible for the merchant to also include payment device data where the merchant has maintained payment device data. The present invention, however, makes it so that if the merchant desires not to be PCI-compliant, the merchant can shield itself from having to store sensitive payment device data and, instead, only be required to provide encrypted payment device data and/or specify the unique identifier in order to complete an electronic payment transaction.

Figure 7:
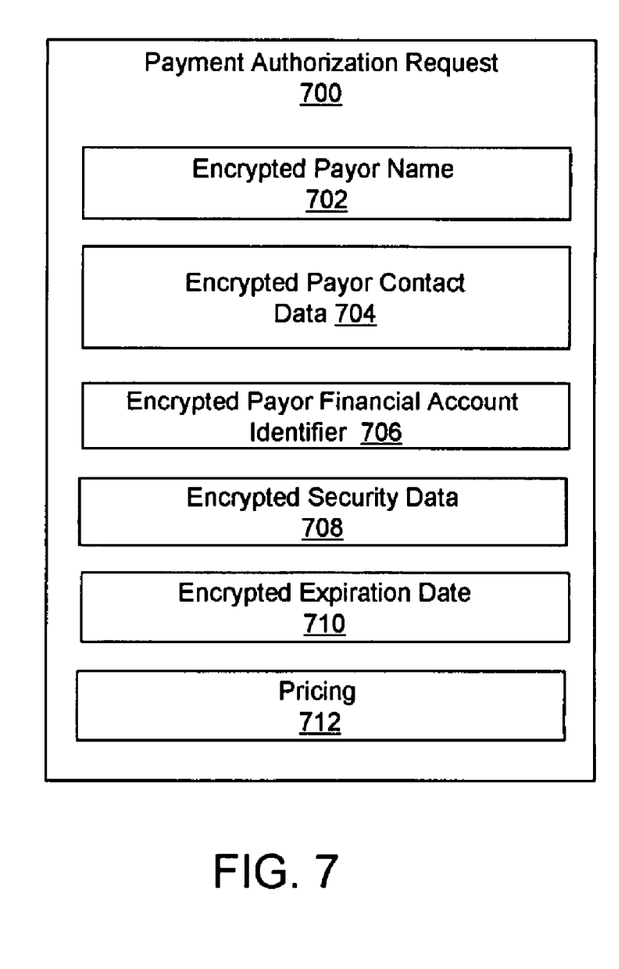
FIG. 7 illustrates an example of another embodiment a payment authorization request.

Furthermore, depending on the secure path the merchant payment system and secure payment system take, different types of payment authorization requests can be generated by the secure payment system. FIGS. 6 and 7 show examples of payment authorization requests that can be sent to the payment gateway. For example, a payment authorization request 600 can include payor name 602, payor contact data 604 (such as address, telephone, email, etc.), payor financial account identifier 606 (such as an account number, routing transit number), security data 608 associated with the payment device (such as a PIN verification data), expiration date 610 of the payor financial account, and payment amount 612 (such as purchase price, tax, total purchase amount, etc.). Some or all of this data can come from the customer account (see FIG. 3) and/or a payment processing request (see FIG. 4). Notably, in one particular embodiment, the sensitive payment data can came from the secure payment system and/or encrypted payment device data and not from the merchant itself, keeping the merchant shielded from access to this sensitive payment data.

FIG. 7 is similar to FIG. 6 and illustrates an example of a payment authorization request that can be used for Path B. Thus, similar elements are referred to with like reference numerals, replacing 600's with 700's. The difference being that many of the elements are encrypted because the secure payment system did not decrypt the payment device data and simply used it to generate an authorization request.

The above systems and methods thus allow a merchant to send sensitive payment device data to the secure payment system, while not requiring the merchant to view the secure payment device data. That is, the transfer of payment device data from the merchant payment system to the secure payment system, in one embodiment, can occur in a manner that the merchant does not view the payment device data being transferred. Thus, the present invention allows the merchant to have the ability to not view payment device data during processing and/or transferring of payment device data.

However, the present invention also allows a merchant to view payment device data, if desired. In these embodiments, preferably sensitive payment device data is displayed to the merchant by obscuring portions of the payment device data such as account numbers, security codes, etc., so that the merchant cannot view sensitive aspects of the payment device data. In any of these embodiments, the secure payment system can return a listing of one or more payment devices in a PCI-compliant manner to the merchant website. For example, the secure payment system can return masked credit card or checking account/routing numbers to the merchant website. The merchant can then auto-populate these payment options into the payment interface and allow the customer to select one of them for payment. Of course, the payment devices returned to the merchant will need to comply with any preferences.

Figure 8:
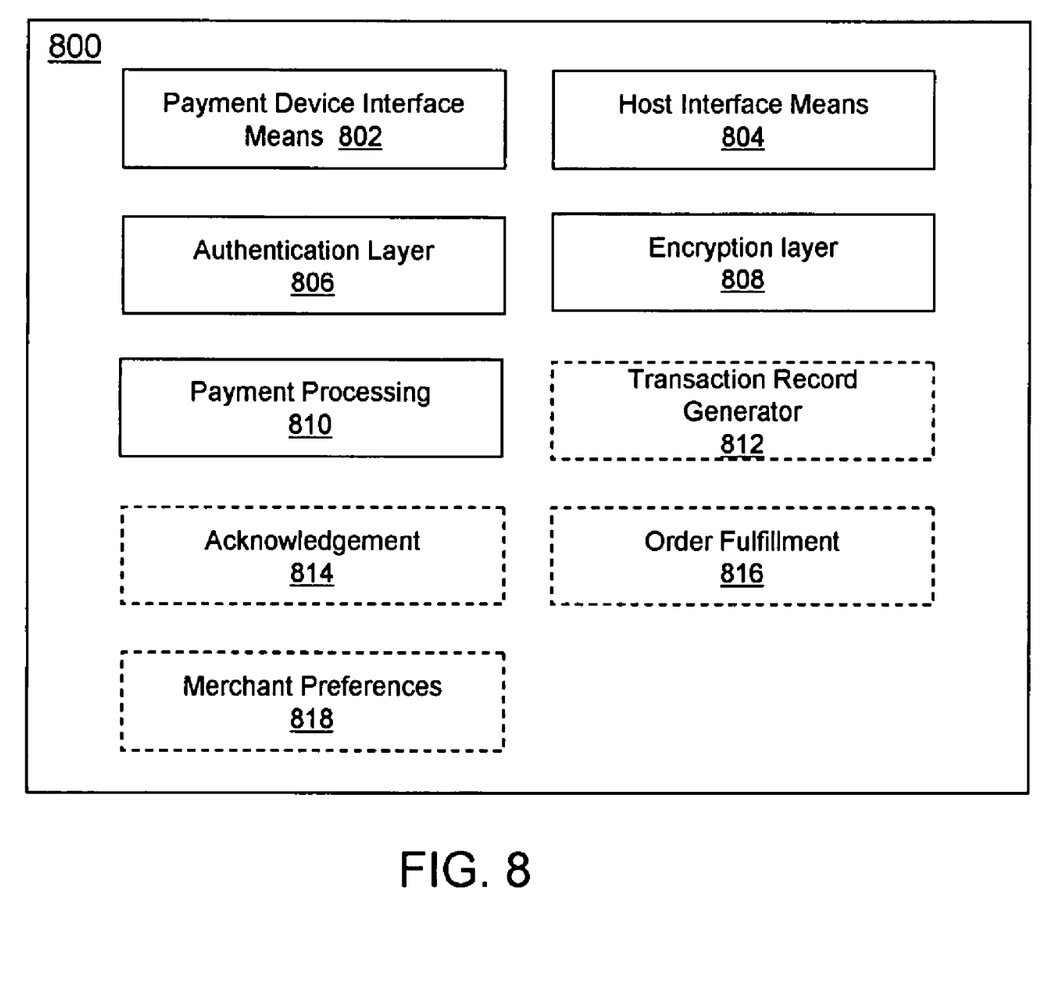
FIG. 8 illustrates an example of a client software application at the merchant payment system.

The merchant payment system has broadly been described above as being any computing device that can perform the functions of the merchant payment system. In one embodiment, secure processor 124 of merchant payment system 104 is preferably a small application that interfaces between the merchant payment device input system and secure payment system 102 located on a remote server. FIG. 8 depicts one embodiment of a client application that can be used for this purpose. The client software 800 includes a payment device interface means 802, a host interface means 804, an authentication layer 806, and an encryption layer 808. The payment device interface means 802 establishes a connection between the payment device input means 123 of the merchant payment system (e.g., swipe device, IR device, keypad, network connection or the like) and the client software 800. Further, the host interface means 804 establishes a connection between the merchant payment system and the secure payment system. This connection can be any suitable connection means such as, but not limited to, an Internet connection, a WAN connection, a hard-wire connection, and the like.

In one embodiment, the payment device interface means 802 includes a listener that detects when the payment device input means is being activated, such as a task signal, a USB signal, a Bluetooth signal, proprietary signal, or the like. The exact manner of establishing a connection between the payment device input means and the client software is not important. In one embodiment, the client software 800 has a continual connection with the payment device input means 123. This can be done if the listener is ready to execute and display the software upon identifying a secure storage device.

The authentication layer 806 requires the merchant to authenticate herself as being authorized to transmit payment information to the payment authorization system. This typically requires a login and password. Other authentication/security measures may be used such as image recognition, CAPTCHA processes, checking licensing or registration information using information stored at the merchant payment system, and/or biometrics.

Once connections have been established and all parties authenticated, the payment processing module 206 initiates obtaining payment device data, such as via payment device interface means 802. The encryption layer 808 encrypts the payment device data without enabling a person to view the payment device data.

The payment processing module 810 generates the first payment processing request using the encrypted payment data the obtain authorization for the payment and/or a unique identifier for the customer. When the payment processing module 810 receives the unique identifier, the payment processing system can store the unique identifier in customer data 122 at the merchant payment system 104. When the payment processing module 810 receives a payment authorization status in response to the first and/or second payment processing request approving, denying, or notifying of a process failure of payment authorization, the payment processing module 810 can display the payment status to the merchant. Note that in one embodiment, during the process of obtaining the payment device information from the secure storage device and submitting a payment processing request and receiving the payment authorization status, the payment device information is never displayed to the merchant, thus maintaining security of the payment process.

The client software 800 thus handles payment processing for the merchant by obtaining payment device information, encrypting the payment device information, and passing the encrypted payment device information to the secure payment system. In some embodiments, it will be desirable to make the client software as simplified as possible so that its functionalities are minimized to reduce the exposure of the software to malicious third parties. With added functionality comes added security/authentication requirements, so it may be preferable to protect more minimal functionalities and limit the client software to just reading the payment device information and encrypting the payment device information, while leaving other functionalities relating to fulfilling a financial transaction to other services.

However, in some embodiments, it may be desirable to provide the merchant with additional transaction functionalities, although, it should be understood that these added functionalities are optional. As shown in FIG. 8, one optional feature is a transaction record generator 812 that uses the captured payment device information to generate a transaction record. The transaction record can includes order information, and payment authorization information. Order information includes information relating to a specific purchase made by the customer. Payment authorization status is information on whether the payment was approved, declined, or whether there was a process failure.

In one optional embodiment, an acknowledgement module 814 allows the merchant to send a transaction record acknowledgement to the customer to inform the customer whether the transaction has been completed or whether there was a problem processing the customer's payment.

Further, the client software may optionally include order fulfillment 816 logic that automatically performs steps to fulfill the financial transaction once the payment is authorized by secure payment system. For example, this can include initiating shipment of goods to the merchant or customer. Or, this can include notifying service providers that a service has been purchased and to schedule and/or fulfill the requested service.

In another optional embodiment, the merchant may be able to specify merchant preferences 818 such as whether the client software is initiated automatically upon performing certain actions, the level of authentication required to access the client software, and the like. Although generally, any merchant preferences will be made through the secure payment system.

It will be appreciated that the merchant payment system can be embodied in one or more computing device. So aspects of the merchant payment system may be located on different devices. For example, in the embodiment of co-pending U.S. patent application Ser. No. 11/943,477, filed Nov. 20, 2007, which disclosure is incorporated herein by reference in its entirety, the merchant payment system may include a specialized storage device which includes an encryption module stored therein so that when the specialized storage device receives a swipe or other input of a payment device, the specialized storage device encrypts the payment device data and stores the encrypted data until it can be retrieved at a later point in time.

Embodiments include general-purpose and/or special-purpose devices or systems that include hardware or hardware and software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When data is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a merchant to perform a payment processing transaction, the method comprising:
   at a merchant payment system,
      identifying customer identification data and unencrypted payment device data;
      encrypting the unencrypted payment device data, wherein identifying customer identification data and unencrypted payment device data and encrypting the unencrypted payment device data includes, at a secure storage device, capturing at least the unencrypted payment device data and encrypting the unencrypted payment device data, and
      storing the encrypted payment device data while the secure storage device does not have an active connection to a secure payment system;
      submitting a first payment processing request to the secure payment system, wherein the payment processing request includes the customer identification data and the encrypted payment device data, wherein submitting a first payment processing request to a secure payment system further includes establishing a connection between the secure storage device and the secure payment system and using a client application on the merchant payment system to read the stored encrypted payment device data to generate the first payment processing request without storing the encrypted payment device data at the merchant payment system such that the encrypted payment device data is not visible to the merchant;
      receiving a unique identifier associated with a customer account that was generated in response to the first payment processing request;
      submitting a second payment processing request to the secure payment system such that the merchant is only required to identify the unique identifier of the customer account and not unencrypted payment device data or encrypted payment device data of the at least one payment device;
      receiving a status from the secure payment system that the second payment processing request is approved, declined, or has experienced an instance of process failure; and
      after receiving the status from the secure payment system that the second payment processing request is approved, declined, or has experienced an instance of process failure, deleting the stored encrypted payment device data from the secure storage device.

2. The method of claim 1 wherein the payment device data is automated clearing house data.

* * * * *